United States Patent
Lee et al.

(10) Patent No.: US 11,479,500 B2
(45) Date of Patent: Oct. 25, 2022

(54) ENAMEL COMPOSITION, METHOD FOR PREPARING ENAMEL COMPOSITION, AND COOKING APPLIANCE

(71) Applicant: LG ELECTRONICS INC., Seoul (KR)

(72) Inventors: Hyeyong Lee, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 269 days.

(21) Appl. No.: 16/796,127

(22) Filed: Feb. 20, 2020

(65) Prior Publication Data

US 2020/0270172 A1   Aug. 27, 2020

(30) Foreign Application Priority Data

Feb. 22, 2019   (KR) .................. 10-2019-0021144

(51) Int. Cl.
  *C03C 8/22*   (2006.01)
  *C03C 8/02*   (2006.01)
  *C03C 8/16*   (2006.01)
  *C03C 8/20*   (2006.01)
  *F24C 15/00*  (2006.01)

(52) U.S. Cl.
  CPC .............. *C03C 8/22* (2013.01); *C03C 8/02* (2013.01); *C03C 8/16* (2013.01); *C03C 8/20* (2013.01); *F24C 15/005* (2013.01); *C03C 2207/04* (2013.01)

(58) Field of Classification Search
  CPC .................. C03C 8/22; F24C 15/005
  See application file for complete search history.

(56) References Cited

U.S. PATENT DOCUMENTS

| | | | |
|---|---|---|---|
| 3,547,098 A | 12/1970 | Lee | |
| 3,580,733 A | 5/1971 | Ott | |
| 3,718,498 A | 2/1973 | Denny et al. | |
| 4,084,975 A * | 4/1978 | Faust | F24C 15/005 126/19 R |
| 4,147,835 A | 4/1979 | Nishino et al. | |
| 4,180,482 A | 12/1979 | Nishino et al. | |
| 4,460,630 A | 7/1984 | Nishino et al. | |
| 4,515,862 A | 5/1985 | Maki et al. | |

(Continued)

FOREIGN PATENT DOCUMENTS

| | | |
|---|---|---|
| AU | 2370367 | 1/1969 |
| BG | 98027 | 3/1994 |

(Continued)

OTHER PUBLICATIONS

European Search Report dated Mar. 24, 2020 issued in Application No. 19207979.6.

(Continued)

*Primary Examiner* — Karl E Group
(74) *Attorney, Agent, or Firm* — Ked & Associates

(57) ABSTRACT

An enamel composition, a method for preparing an enamel composition, and a cooking appliance including an enamel composition are provided. The enamel composition may include a base glass frit, and a catalytic glass frit. Further, the enamel composition may include 3 to 20 parts by weight of the catalytic glass frit based on 100 parts by weight of the base glass frit.

4 Claims, 4 Drawing Sheets

(56) References Cited

U.S. PATENT DOCUMENTS

| | | | |
|---|---|---|---|
| 4,877,758 A | 10/1989 | Lee et al. | |
| 5,650,364 A | 7/1997 | Münstedt et al. | |
| 5,747,395 A | 5/1998 | Smith et al. | |
| 6,123,874 A | 9/2000 | Fukaya et al. | |
| 6,321,569 B1 | 11/2001 | Sreeram et al. | |
| 6,350,495 B1* | 2/2002 | Schriener | C03C 8/22 106/491 |
| 6,429,161 B1 | 8/2002 | Souchard et al. | |
| 6,511,931 B1* | 1/2003 | Baldwin | F24C 15/005 501/24 |
| 6,566,289 B2 | 5/2003 | Aronica et al. | |
| 6,652,972 B1 | 11/2003 | Conzone et al. | |
| 6,881,690 B2* | 4/2005 | Kawamura | C03C 8/22 501/16 |
| 6,924,246 B2* | 8/2005 | Kato | C03C 3/091 501/16 |
| 7,763,557 B2 | 7/2010 | Baldwin et al. | |
| 8,815,347 B2* | 8/2014 | Shimoda | C09K 15/02 427/372.2 |
| 2003/0119647 A1 | 6/2003 | Sanichi et al. | |
| 2003/0162646 A1* | 8/2003 | Kawamura | C03C 8/22 501/16 |
| 2003/0187118 A1 | 10/2003 | Aronica et al. | |
| 2004/0043053 A1 | 3/2004 | Yu et al. | |
| 2004/0069764 A1 | 4/2004 | Imai et al. | |
| 2005/0014625 A1* | 1/2005 | Espargilliere | C03C 3/19 501/48 |
| 2005/0148722 A1 | 7/2005 | Aronica et al. | |
| 2008/0044488 A1 | 2/2008 | Zimmer et al. | |
| 2009/0311514 A1 | 12/2009 | Shon et al. | |
| 2010/0009837 A1 | 1/2010 | Sakoske | |
| 2010/0264126 A1 | 10/2010 | Baek et al. | |
| 2011/0011423 A1 | 1/2011 | Baek et al. | |
| 2011/0049122 A1 | 3/2011 | Baek et al. | |
| 2011/0174826 A1 | 7/2011 | Le Bris et al. | |
| 2011/0262758 A1 | 10/2011 | Benford, Jr. et al. | |
| 2011/0277505 A1 | 11/2011 | Sakoske | |
| 2013/0149444 A1 | 6/2013 | Le Bris et al. | |
| 2013/0299482 A1 | 11/2013 | Kim et al. | |
| 2013/0299484 A1 | 11/2013 | Lee et al. | |
| 2015/0083109 A1 | 3/2015 | Baek et al. | |
| 2018/0170797 A1 | 6/2018 | Gorecki et al. | |
| 2018/0215654 A1 | 8/2018 | Choi et al. | |
| 2018/0215655 A1 | 8/2018 | Kim et al. | |
| 2019/0002336 A1 | 1/2019 | Kim et al. | |
| 2019/0092680 A1 | 3/2019 | Kim et al. | |
| 2019/0337837 A1 | 11/2019 | Kim et al. | |
| 2020/0115274 A1 | 4/2020 | Awagakubo et al. | |
| 2020/0148583 A1 | 5/2020 | Choi et al. | |
| 2020/0270167 A1 | 8/2020 | Choi et al. | |
| 2020/0270168 A1 | 8/2020 | Choi et al. | |
| 2020/0270171 A1 | 8/2020 | Gwoo et al. | |

FOREIGN PATENT DOCUMENTS

| | | |
|---|---|---|
| CN | 1042890 | 6/1990 |
| CN | 1105343 | 7/1995 |
| CN | 1108626 | 9/1995 |
| CN | 1176942 | 3/1998 |
| CN | 1487240 | 4/2004 |
| CN | 1892962 | 1/2007 |
| CN | 101067207 | 11/2007 |
| CN | 101094818 | 12/2007 |
| CN | 101182119 | 5/2008 |
| CN | 101519275 | 9/2009 |
| CN | 101519276 | 9/2009 |
| CN | 101734858 | 6/2010 |
| CN | 102066011 | 5/2011 |
| CN | 102086091 | 6/2011 |
| CN | 102089253 | 6/2011 |
| CN | 102219383 | 10/2011 |
| CN | 102368933 | 3/2012 |
| CN | 102369168 | 3/2012 |
| CN | 102422085 | 4/2012 |
| CN | 102517582 | 6/2012 |
| CN | 104891805 | 9/2015 |
| CN | 104891810 | 9/2015 |
| CN | 105621889 | 6/2016 |
| CN | 106957149 | 7/2017 |
| CN | 107513747 | 12/2017 |
| CN | 108059341 | 5/2018 |
| CN | 108675636 | 10/2018 |
| CN | 108863074 | 11/2018 |
| EP | 0 086 109 | 8/1983 |
| EP | 0 453 897 | 10/1991 |
| EP | 0 565 941 | 10/1993 |
| EP | 1 160 283 | 12/2001 |
| EP | 1 256 556 | 11/2002 |
| EP | 1 298 099 | 4/2003 |
| EP | 2 662 341 | 11/2013 |
| EP | 3 357 877 | 8/2018 |
| EP | 3 459 914 | 3/2019 |
| EP | 3 578 525 | 12/2019 |
| EP | 3 650 414 | 5/2020 |
| GB | 1 214 261 | 12/1970 |
| HU | 01 00796 | 8/2002 |
| JP | S54-77618 | 6/1979 |
| JP | S54-106529 | 8/1979 |
| JP | S56-78450 | 6/1981 |
| JP | S63-230537 | 9/1988 |
| JP | S63-230538 | 9/1988 |
| JP | 2001-080935 | 3/2001 |
| JP | 2001-303276 | 10/2001 |
| JP | 2002-367510 | 12/2002 |
| JP | 2003-206417 | 7/2003 |
| JP | 2004-269322 | 9/2004 |
| JP | 2004-358846 | 12/2004 |
| JP | 2005-008974 | 1/2005 |
| JP | 2014-148465 | 8/2014 |
| JP | 2014-221937 | 11/2014 |
| JP | 2016-030849 | 3/2016 |
| KR | 10-2011-0023079 | 3/2011 |
| KR | 10-2013-0125907 | 11/2013 |
| KR | 10-2013-0125910 | 11/2013 |
| KR | 10-2013-0125918 | 11/2013 |
| KR | 10-2014-0014658 | 2/2014 |
| KR | 10-2014-0115562 | 10/2014 |
| KR | 10-1476501 | 12/2014 |
| KR | 10-2018-0089986 | 8/2018 |
| KR | 10-2018-0089988 | 8/2018 |
| RU | 2007112383 | 10/2008 |
| WO | WO 95/09131 | 4/1995 |
| WO | WO 01/92413 | 12/2001 |
| WO | WO 02/02471 | 1/2002 |
| WO | WO 03/008354 | 1/2003 |
| WO | WO 2018/143704 | 8/2018 |
| WO | WO 2018/198986 | 11/2018 |
| WO | WO 2019/203565 | 10/2019 |

OTHER PUBLICATIONS

United States Notice of Allowance dated Nov. 23, 2021 issued in co-pending related U.S. Appl. No. 16/795,923.
European Search Report dated Jun. 24, 2020 issued in EP Application No. 20158729.2.
European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.
European Search Report dated Jul. 22, 2020 issued in EP Application No. 20158690.6.
Chinese Office Action dated Jul. 26, 2021 issued in CN Application No. 1911042287.3.
Chinese Office Action dated Jul. 27, 2021 issued in CN Application No. 202010107767.X.

(56) References Cited

OTHER PUBLICATIONS

Chinese Office Action dated Jul. 28, 2021 issued in CN Application No. 202010107396.5.
Chinese Office Action dated Jul. 28, 2021 issued in CN Application No. 202010107406.5.
Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
U.S. Appl. No. 16/666,979, filed Oct. 29, 2019.
U.S. Appl. No. 16/676,903, filed Nov. 7, 2019.
U.S. Appl. No. 16/795,923, filed Feb. 20, 2020.
U.S. Appl. No. 16/795,959, filed Feb. 20, 2020.
U.S. Appl. No. 16/796,066, filed Feb. 20, 2020.
U.S. Appl. No. 16/796,052, filed Feb. 20, 2020.
U.S. Appl. No. 16/796,075, filed Feb. 20, 2020.
U.S. Appl. No. 16/796,102, filed Feb. 20, 2020.
European Search Repot dated Mar. 24, 2020 issued in Application No. 19205924.4.
United States Office Action dated Mar. 25, 2021 issued in co-pending related U.S. Appl. No. 16/666,979.
United States Office Action dated Apr. 6, 2021 issued in co-pending related U.S. Appl. No. 16/676,903.

* cited by examiner

ENAMEL COMPOSITION, METHOD FOR PREPARING ENAMEL COMPOSITION, AND COOKING APPLIANCE

CROSS-REFERENCE TO RELATED APPLICATION(S)

The present disclosure claims priority to and the benefit of Korean Patent Application No. 10-2019-0021144, filed in Korea on Feb. 22, 2019, the disclosure of which is incorporated herein by reference in its entirety.

BACKGROUND

1. Field

An enamel composition, a method for preparing an enamel composition, and a cooking appliance are disclosed herein.

2. Background

Enamels may be prepared by applying a glass glaze to a surface of a metal plate. Enamels may be used in cooking appliances, such as microwaves and ovens. Cooking appliances, such as microwaves and gas ovens, may cook food or other items (hereinafter, collectively "food") using a heating source. As contaminants generated during cooking may be adhered to an inner wall of a cavity of the cooking appliance, the inner wall of the cavity thereof may be cleaned. Further, food may be cooked at high temperature and the inner wall of the cavity thereof may be exposed to organic substances and alkali components. Therefore, the enamel composition may be coated on the inner wall to facilitate cleaning of the inner wall of the cavity thereof, and in particular, the enamel composition may be used to facilitate cleaning with respect to oil contaminants, such as cooking oil, beef oil, pork oil, or chicken oil, in a temperature range of 60 to 90° C. for 10 to 15 minutes. However, the enamel composition may require a high cleaning temperature, and in particular, oil contaminants containing a large amount of unsaturated fatty acids, such as chicken oil, may not be completely removed using the enamel composition. Accordingly, the enamel composition may facilitate cleaning at room temperature such that the cleaning may be performed easily and may enable easy removal of oil contaminants, such as chicken oil, due to excellent contamination resistance.

Expensive raw materials are used to improve a cleaning performance obtained using the enamel composition. The cleaning performance may be required to be maximized at lowest cost.

Other enamel compositions may contain a large amount of catalytic oxide, for example, a metal oxide, such as manganese dioxide ($MoO_2$), to facilitate cleaning. Catalytic oxides may facilitate cleaning using the enamel composition while catalytic oxides degrade durability, such as chemical resistance. Accordingly, it is of interest to provide an enamel composition that facilitates cleaning and has excellent durability.

BRIEF DESCRIPTION OF THE DRAWINGS

Embodiments will be described in detail with reference to the following drawings in which like reference numerals refer to like elements, and wherein.

DETAILED DESCRIPTION

Enamel Composition

Figure 1:
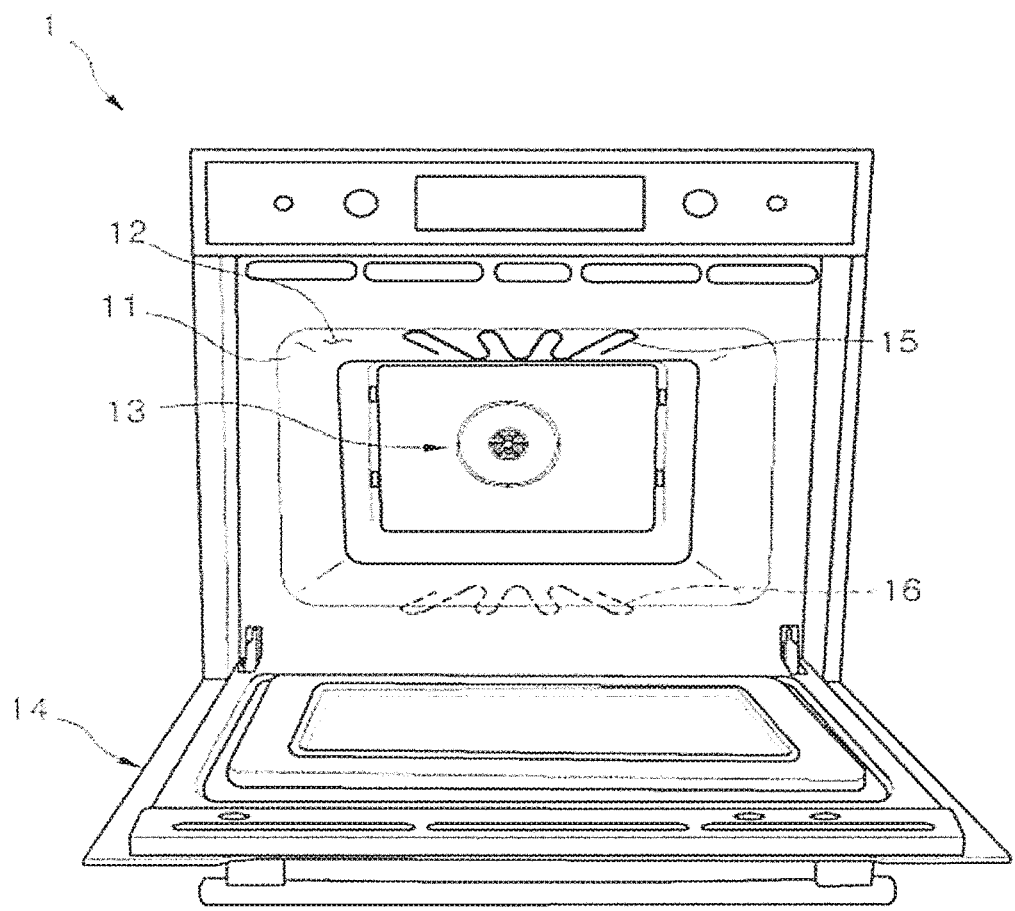
FIG. 1 is a front perspective view of a cooking appliance according to an embodiment.

An enamel composition according to embodiments may include a base glass frit, and a catalytic glass frit. The enamel composition may include 3 to 20 parts by weight of the catalytic glass frit based on 100 parts by weight of the base glass frit.

The enamel composition according to embodiments may be prepared by mixing the base glass frit as a base component of the enamel composition and a catalytic glass frit that allows easy cleaning. The enamel composition may include a less amount of catalytic glass frit based on an amount of the base glass frit.

Various types of enamel compositions are known in the art, and in particular, an enamel composition may facilitate cleaning with respect to an inside of a cooking appliance at relatively low temperatures. However, related art enamel compositions that facilitate cleaning require temperature conditions, for example, a temperature range of 60 to 90° C. and a cleaning time of about 10 to 15 minutes. According to embodiments disclosed herein, the enamel composition may include mixed glass fit and a metal oxide catalyst component to thereby facilitate cleaning under room temperature conditions, for example, in a temperature range of about 15 to 25° C. for about 10 minutes.

Related art enamel compositions that facilitate cleaning may not enable complete removal of chicken oil contaminants. Chicken oil contains a large amount of unsaturated fatty acids having a greater number of double bonds and may facilitate fixation to a surface coated with the enamel composition. Therefore, it may be significantly difficult to remove chicken oils from the coating surface during cleaning of the coating surface. However, according to embodiments, the catalytic glass frit included in the enamel composition may also enable formation of a gap between contaminants, such as chicken oils, and the coating surface, such that the enamel composition including a metal oxide catalyst component enables easy removal of chicken oils in comparison to other enamel compositions.

Frits including the metal oxide catalyst component capable of providing the cleaning performance to the enamel composition may be used as examples of the catalytic glass frit used in embodiments without limitation. The catalytic glass frit may include 15 to 20 wt % of silicon dioxide ($SiO_2$), 20 to 30 wt % of phosphorus pentoxide ($P_2O_5$), 5 to 15 wt % of boron oxide ($B_2O_3$), 15 to 30 wt % of a Group I oxide, 0.1 to 15 wt % of a Group II oxide, 15 to 30 wt % of aluminum oxide ($A_2O_3$), 5 to 25 wt % of titanium dioxide ($TiO_2$), 1 to 5 wt % of zirconium dioxide ($ZrO_2$), and 5 to 10 wt % of molybdenum oxide ($MoO_3$), for example.

$SiO_2$ forms a glass structure and may be used to improve durability of the enamel composition by strengthening a skeleton of the glass structure. $SiO_2$ may be contained in a range of 15 to 20 wt %. If the content of $SiO_2$ exceeds 20 wt %, the addition of other components may be prevented, thereby degrading various properties of the enamel composition. If the content of $SiO_2$ is less than 15 wt %, the glass composition may be disrupted.

$P_2O_5$ forms a glass structure and may be used to improve durability of the enamel composition by strengthening a skeleton of the glass structure. $P_2O_5$ may be contained in the enamel composition in a range of 20 to 30 wt %. If the content of $P_2O_5$ exceeds 30 wt %, the addition of other components may be prevented, thereby degrading various properties of the enamel composition. If the content of $P_2O_5$ is less than 20 wt %, the glass composition may be disrupted.

$B_2O_3$ functions as a glass-forming agent and may function to uniformly dissolve components of the catalytic glass frit. $B_2O_3$ may also improve a coating performance of the enamel composition by controlling a coefficient of thermal expansion and a fusion flow of the enamel composition. $B_2O_3$ is contained in a range of 5 to 15 wt %. If the content of $B_2O_3$ exceeds 15 wt %, the addition of other components may be prevented, thereby degrading various properties thereof. If the content of $B_2O_3$ is less than 5 wt %, the glass composition may be disrupted or crystallization of the glass composition may occur.

A Group I oxide contained in the catalytic glass frit of the enamel composition may be used to facilitate cleaning using the enamel composition. The Group I oxide may include at least one of lithium superoxide ($Li_2O$), sodium oxide ($Na_2O$), or potassium oxide ($K_2O$). The Group I oxide may be contained in the catalytic glass frit in the range of 15 to 30 wt %. If the content of Group I oxide exceeds 30 wt %, thermal properties of the enamel composition may be degraded. If the content of Group I oxide is less than 15 wt %, a cleaning function thereof is degraded.

A Group II oxide contained in the catalytic glass frit of the enamel composition may be used to facilitate cleaning. The Group II oxide may include at least one of calcium oxide (CaO), magnesium oxide (MgO), or barium oxide (BaO). The Group II oxide may be contained in the catalytic glass frit in a range of 0.1 to 15 wt %. If the content of the Group II oxide exceeds 15 wt %, thermal properties of the enamel composition may be degraded. If the content of Group I oxide is less than 0.1 wt %, a cleaning function may be degraded.

According to embodiments, the catalytic glass frit may include 15 to 30 wt % of $Al_2O_3$, 5 to 25 wt % of $TiO_2$, 1 to 5 wt % of $ZrO_2$, and 5 to 10 wt % of $MoO_3$. $Al_2O_3$, $TiO_2$, $ZrO_2$ and $MoO_3$, which each facilitates cleaning and enables formation of a gap between contaminants and the coating surface. If each of the above components exceeds a maximum content, durability of the enamel composition may be degraded. If each of the components is less than a minimum content, a cleaning performance may be degraded. According to embodiments, the catalytic glass frit may further include other components, which are not mentioned above, as necessary.

The enamel composition according to embodiments may include a base glass frit. The frits used in the enamel composition may be used as examples of the base glass frit without limitation.

The enamel composition according to embodiments may include a base glass frit and facilitate cleaning. The base glass frit may include 5 wt % or less of at least one of cobalt oxide ($CoO_3$), nickel oxide (NiO), ferric oxide ($Fe_2O_3$), or manganese (VI) oxide ($MnO_3$), which are relatively expensive. Even if the base glass frit contains a small amount of components that facilitate cleaning, a cleaning performance achieved using the enamel composition according to embodiments is not degraded.

The enamel composition according to embodiments may include a base glass frit, and a catalytic glass frit. For example, the enamel composition may include 3 to 20 parts by weight of the catalytic glass frit based on 100 parts by weight of the glass frit. If the catalytic glass frit is included in an amount less than 3 parts by weight, a cleaning performance achieved using the enamel composition may be degraded. If the catalytic glass frit is included in an amount exceeding 20 parts by weight, a coating performance of the enamel composition or durability thereof may be degraded. According to embodiments, the enamel composition may include the base glass frit and a minimum amount of catalytic glass frit and facilitate cleaning at low cost.

Method for Preparing Enamel Composition

A method 100 for preparing an enamel composition according to embodiments may include preparing a base glass frit (110); preparing a catalytic glass frit (120); and mixing the base glass frit and the catalytic glass frit (130). The mixing may include mixing 3 to 20 parts by weight of the catalytic glass frit based on 100 parts by weight of the base glass frit. The enamel composition refers to a composition in which the base glass frit and the catalytic glass frit are mixed. The enamel composition may be prepared by mixing the base glass frit with the catalytic glass frit in a specific mixing ratio. Accordingly, embodiments provide a simple preparation method.

Preparing the base glass frit and the catalytic glass frit may include preparing a glass frit obtained through the following method using components of a glass frit as a main component of the enamel composition and a catalytic glass frit obtained using components of the catalytic glass frit. Preparing the base glass frit may include preparing and melting components of a base glass frit, and quenching the melted components of the base glass frit to form a base glass frit. Similarly, preparing the catalytic glass frit may include preparing and melting the catalytic glass frit, and quenching the melted components of the catalytic glass frit to form a catalytic glass frit. Each of types, a function, and a content range of each of the components included in each of the base glass frit and the catalytic glass frit is as described above.

The method may include mixing 100 parts by weight of the base glass frit with 3 to 20 parts by weight of the catalytic glass frit; however, embodiments are limited thereto.

Cooking Appliance

An enamel composition according to embodiments may be coated on a surface of a target coating object. The target object may be a metal plate, a glass plate, and a portion or all of a cooking appliance. The enamel composition may be coated on an inner surface of a cavity of the cooking appliance or an inner surface of a door of the cooking appliance.

Referring to FIG. 1, a cooking appliance 1 according to embodiments may include a cavity 11 that defines a cooking chamber, a door 14 that selectively opens and closes the cooking chamber, at least one of heating source 13, 15, and 16 that provides heat to the cooking chamber, and a coating layer coated on at least one of an inner surface of the cavity 11 or an inner surface of the door 14 and formed using the enamel composition according to embodiments. The cavity 11 may have a hexahedral shape and an open front surface. The heating sources 13, 15, and 16 may include a convection assembly 13 that discharges heated air into the cavity 11, an upper heater 15 disposed at an upper portion of the cavity 11, and a lower heater 16 disposed at a lower portion of the cavity 11. Each of the upper heater 15 and the lower heater 16 may be provided inside or outside of the cavity 11. The heating sources 13, 15, and 16 may not necessarily include the convection assembly 13, the upper heater 15, and the lower heater 16. For example, the heating sources 13, 15, and 16 may include at least one of the convection assembly 13, the upper heater 15, or the lower heater 16.

Figure 2:
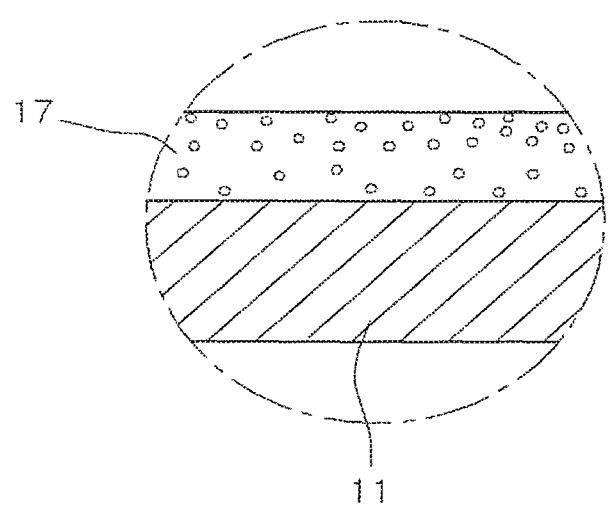
FIG. 2 is an enlarged partial cross-sectional view of a portion of an inner surface of a cavity of the cooking appliance in FIG. 1.
Figure 3:
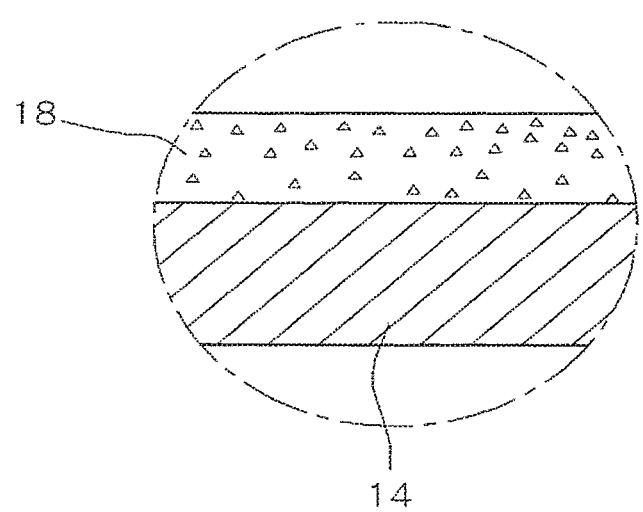
FIG. 3 is an enlarged partial cross-sectional view of a portion of an inner surface of a door of the cooking appliance in FIG. 1.
Figure 4:
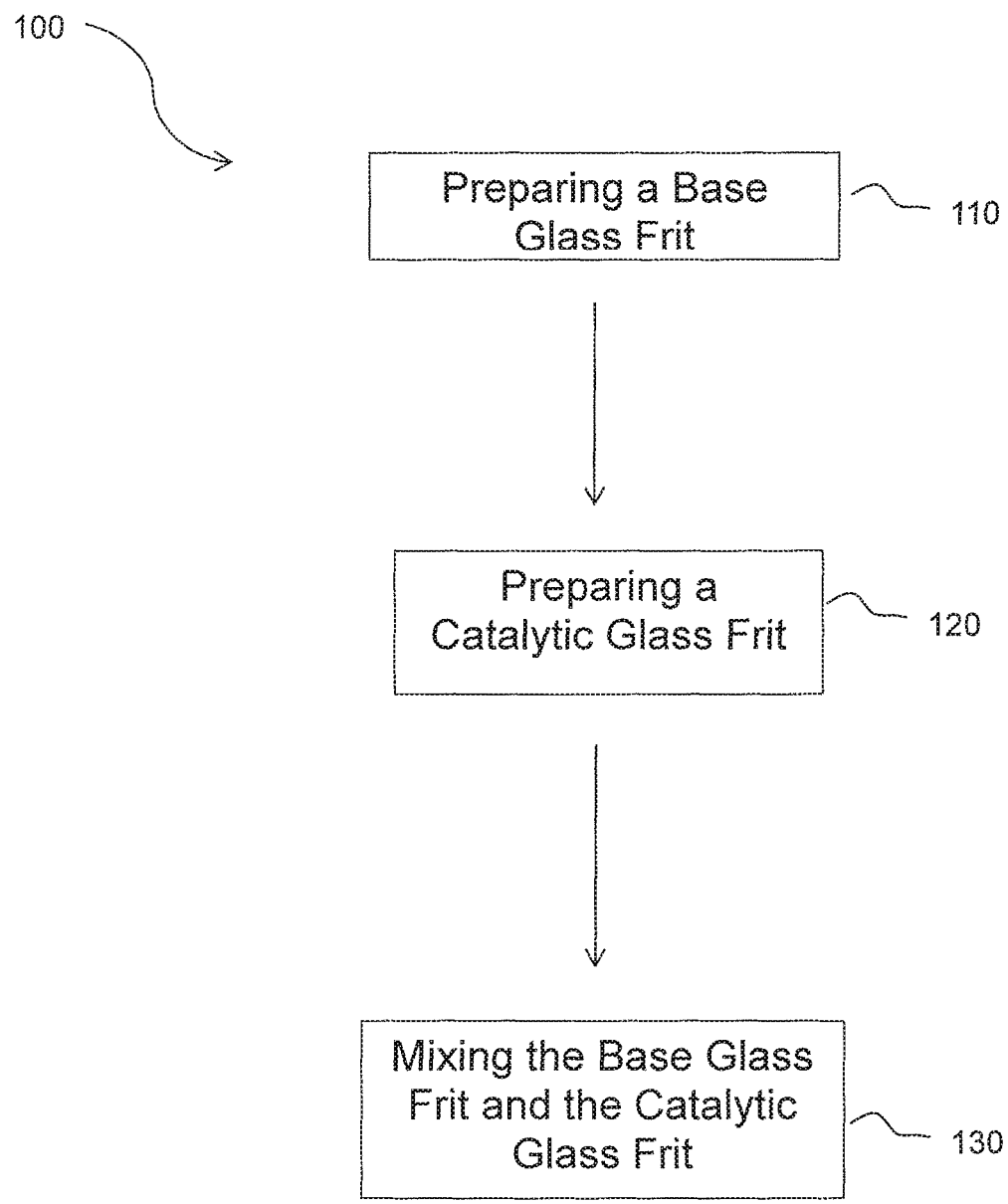
FIG. 4 is a flowchart of a method for preparing an enamel composition according to an embodiment.

Referring to FIGS. 2 and 3, the enamel composition may be coated on the inner surface of the cavity 11 or the inner surface of the door 14 of the cooking appliance 1 through a dry process or a wet process. The cavity 11 and the door 14 each may be made of a metal plate. Each of the coating layers 17 and 18 formed using the enamel composition may be coated on the metal plate as a single layer.

In the dry process, the enamel composition may be dispersed in an organic binder, and the mixed enamel composition and organic binder milled in a ball mill to prepare a glass frit. In the wet process, the enamel composition may be dispersed in water ($H_2O$) and pigment, and the mixed enamel composition, water ($H_2O$), and the pigment may be milled in a ball mill to prepare a glass frit.

Subsequently, the glass frit prepared through the dry process and the wet process may be applied on the inner surface of the cavity 11 or the inner surface of the door 14 of the cooking appliance 1 by spray, for example. The applied glass frit may be fired for 100 to 450 seconds in a temperature range of 600 to 900° C. and may be coated on the inner surface of the cavity 11 or the inner surface of the door 14 of the cooking appliance 1.

Embodiments are described hereinafter with reference to embodiments and examples.

Embodiment

Preparation of Enamel Composition

1. Preparation of Base Glass Frit

A base glass frit having a composition ratio shown in Table 1 below was prepared. Raw materials of components thereof were sufficiently mixed in a V-mixer for three hours. The mixed materials were placed in a furnace at 900° C. and heated up to 1200° C. while increasing the temperature by 10° C. per minute, and then sufficiently melted for 30 minutes. Subsequently, the materials were quenched using a quenching roller to obtain a glass cullet.

The glass cullet obtained through the above process was controlled to have an initial particle size using a mill, such as, for example, a ball mill, and passed through a 200-mesh sheave after grinding for about five hours using a jet mill to control particle size, thereby preparing a base glass frit according to Preparation Example 1.

TABLE 1

| | Components of Glass Frit | | | | | | | | | | | |
|---|---|---|---|---|---|---|---|---|---|---|---|---|
| | $P_2O_5$ | $SiO_2$ | $B_2O_3$ | $Al_2O_3$ | $ZrO_2$ | $K_2O$ | $TiO_2$ | NaF | $Li_2O$ | $Na_2O$ | $MnO_2$ | $Fe_2O_3$ |
| Preparation Example 1 | 23.5 | 23.8 | 10.4 | 16.9 | 2.9 | 12.9 | 1.9 | 0.9 | 0.5 | 5.7 | 0.4 | 0.2 |

2. Preparation of Catalytic Glass Frit

A catalytic glass frit having a composition ratio shown in Table 2 below was prepared. Raw materials of components of the glass frit were sufficiently mixed in a V-mixer for three hours. The mixed materials were placed in a furnace at 985° C. and heated up to 1300° C. while increasing the temperature by 10° C. per minute, and then sufficiently melted for 30 minutes. Subsequently, the materials were quenched using a quenching roller to obtain a glass cullet.

The glass cullet obtained through the above process was controlled to have an initial particle size using a mill, such as, for example, a ball mill, and passed through a 100-mesh sheave after grinding for about five hours using a jet mill and obtained particles that have not passed through the 200-mesh sheave to prepare a catalytic glass frit according to Preparation Example 2.

TABLE 2

| | Components of Glass Frit | | | | | | | | | |
|---|---|---|---|---|---|---|---|---|---|---|
| | $SiO_2$ | $P_2O_5$ | $B_2O_3$ | $Na_2O$ | $K_2O$ | CaO | $Al_2O_3$ | $TiO_2$ | $ZrO_2$ | $MoO_3$ |
| Preparation Example 2 | 16.1 | 24 | 8.6 | 13.2 | 5.5 | 1.2 | 15.8 | 10.1 | 1.9 | 3.6 |
| Preparation Example 3 | 17.3 | 22 | 8.6 | 12.2 | 5.4 | 1.3 | 15.8 | 10.1 | 1.9 | 5.4 |

3. Preparation of Enamel Composition

The base glass frit according to Preparation Example 1 and the catalytic glass frit according to Preparation Examples 2 and 3 were mixed with each other to prepare an enamel composition according to an embodiment. The comparative example shows an enamel composition made only of the base glass frit. The components of each of Embodiments and Comparative Example are shown in Table 2 below.

TABLE 2

| Enamel Component | Embodiment | | | Comparative Example |
|---|---|---|---|---|
| | 1 | 2 | 3 | 1 |
| Base Glass Frit (parts by weight) | Preparation Example 1 (100) | Preparation Example 1 (100) | Preparation Example 1 (100) | Preparation Example 1 (100) |
| Catalytic Glass Frit (parts by weight) | Preparation Example 2 (5) | Preparation Example 2 (15) | Preparation Example 3 (10) | Not Present |

Preparation of Specimen Enamel Composition 0.9 g of an enamel composition according to Embodiments 1 to 7 and Comparative Example 1 was put onto a low-carbon steel sheet having an area of 200×200 mm and a thickness of 1 mm or less and was applied thinly. The sheet was fired at a temperature of 750° C. for 300 seconds to prepare a specimen.

Experimental Example

Cleaning performance with respect to the specimens for the enamel composition prepared according to embodiments and comparative examples was measured as follows.

Each of 1 g of chicken oil and 1 g of olive oil as a contaminant was applied thinly onto a surface of specimen, which was prepared by coating an enamel composition on a metal substrate (having an area of 100×100 mm), using a brush. Subsequently, the specimen to which the contaminants was applied was put into a thermostat and the contaminants were fixed at temperatures of 250, 270, and 290° C. for one hour.

The specimen was naturally cooled and curing degrees thereof were determined, followed by wiping the cured contaminants with a force of 3 kgf or less using a frying pan cleaning sponge moistened with room-temperature water. A bar having a diameter of 5 cm and a flat bottom was used to uniformly wipe the contaminants on the surface of the specimen. In this case, the number of wiping cycles is referred to as "the number of cleaning cycles". Cleaning performance evaluation indexes are described in Table 3. The cleaning performance on the specimen is described in Table 4.

TABLE 3

| Number of Cleaning Cycles | LEVEL |
|---|---|
| 1 to 5 | LV. 5 |
| 6 to 15 | LV. 4 |
| 16 to 25 | LV. 3 |
| 26 to 50 | LV. 2 |
| 51 or more | LV. 1 |

TABLE 4

| Contaminant (Treating Temperature) | Embodiment | | | Comparative Example |
|---|---|---|---|---|
| | 1 | 2 | 3 | 1 |
| Chicken Oil (250° C.) | LV. 5 | LV. 5 | LV. 4 | LV. 1 |
| Chicken Oil (270° C.) | LV. 4 | LV. 4 | LV. 4 | LV. 1 |
| Chicken Oil (290° C.) | LV. 4 | LV. 4 | LV. 4 | LV. 1 |
| Olive Oil (250° C.) | LV. 5 | LV. 5 | LV. 5 | LV. 1 |
| Olive Oil (270° C.) | LV. 4 | LV. 4 | LV. 4 | LV. 1 |
| Olive Oil (290° C.) | LV. 4 | LV. 4 | LV. 4 | LV. 1 |

Embodiments disclosed herein showed improved cleaning performance due to proper distribution of the metal oxide catalyst onto the surface of the coating layer. In contrast to embodiments, comparative example showed degraded cleaning performance due to the enamel composition including no metal oxide catalyst.

Embodiments disclosed herein provide an enamel composition that facilitates cleaning at room temperature without increasing a temperature to a high temperature and enables easy removal of oil contaminants, such as chicken oils, without soaking in water. Embodiments disclosed herein also provide an enamel composition that may maximize cleaning performance at low cost and having excellent durability, such as chemical resistance. Embodiments disclosed herein further provide a method for preparing an enamel composition capable of using the catalytic oxide for the enamel composition in a simple manner.

According to embodiments, in order to provide an enamel composition that facilitates cleaning at room temperature and enables easy removal of oil contaminants, such as chicken oil, without soaking in water, the enamel composition may include a base glass frit, and a catalytic glass frit. The enamel composition may include 3 to 20 parts by weight of the catalytic glass frit based on 100 parts by weight of the base glass frit. According to embodiments, in order to provide an enamel composition that may maximize a cleaning performance at an inexpensive cost and having excellent durability, such as chemical resistance, the enamel composition may include a base glass frit including metal oxide such as at least one of $CoO_3$, $NiO$, $Fe_2O_3$, or $MnO_3$ in an amount of 5 percent by weight (wt %) or less.

According to embodiments, in order to provide a method for preparing an enamel composition that uses catalytic oxide easily and simply, the method may include preparing a base glass frit and a catalytic glass frit; and mixing 100 parts by weight of the base glass frit with 3 to 20 parts by weight of the catalytic glass frit. The enamel composition may include the base glass frit and the catalytic glass frit, and may facilitate cleaning at room temperature without increasing a temperature to a high temperature and may enable easy removal of oil contaminants, such as chicken oils, due to excellent contamination resistance thereof.

The enamel composition according to embodiments may include a less amount of catalytic glass frit, and the base glass frit may include a less amount of expensive components, thereby maximizing cleaning performance at low cost. Embodiments may also provide an enamel composition prepared by mixing the glass frit and the metal oxide catalyst to obtain excellent effects through a simple method.

Although embodiments have been described as described above, the embodiments are not limited to the embodiments disclosed herein, and various modifications may be made by those skilled in the art within the scope of the technical idea. Further, even if working effects obtained based on configurations are not explicitly described in the description of embodiments, effects predictable based on the corresponding configuration have to be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles. More particularly, various variations and modifications are possible in the component parts and/or arrangements of the subject combination arrangement within the scope, the drawings and the appended claims. In addition to variations and modifications in the component parts and/or arrangements, alternative uses will also be apparent to those skilled in the art.

What is claimed is:

1. An enamel composition, comprising:
   a base glass frit; and
   a catalytic glass frit, wherein the enamel composition comprises 3 to 20 parts by weight of the catalytic glass frit based on 100 parts by weight of the base glass frit, and wherein the catalytic glass frit comprises:
   15 to 20 percent by weight (wt %) of silicon dioxide ($SiO_2$);
   20 to 30 wt % of phosphorus pentoxide ($P_2O_5$);
   5 to 15 wt % of boron oxide ($B_2O_3$);
   15 to 30 wt % of a Group I oxide;
   0.1 to 15 wt % of a Group II oxide;
   15 to 30 wt % of aluminum oxide ($Al_2O_3$);
   5 to 25 wt % of titanium dioxide ($TiO_2$);
   1 to 5 wt % zirconium dioxide ($ZrO_2$); and
   5 to 10 wt % molybdenum trioxide ($MoO_3$).

2. The enamel composition of claim 1, wherein the Group I oxide comprises at least one of sodium oxide ($Na_2O$), potassium oxide ($K_2O$), or lithium superoxide ($Li_2O$).

3. The enamel composition of claim 1, wherein the Group II oxide comprises at least one of calcium oxide (CaO), magnesium oxide (MgO), or barium oxide (BaO).

4. The enamel composition of claim 1, wherein the base glass frit comprises 5 wt % or less of at least one of cobalt oxide ($CoO_3$), nickel oxide (NiO), ferric oxide ($Fe_2O_3$), or manganese (VI) oxide ($MnO_3$).

* * * * *